United States Patent

[11] 3,602,694

[72] Inventors Rii Watanabe
Tagata-gun, Shizuoka-ken;
Kiyokazu Kobayashi, Tagata-gun,
Shizuoka-ken; Takashi Murakami,
Mishima-shi, all of, Japan
[21] Appl. No. 736,475
[22] Filed June 12, 1968
[45] Patented Aug. 31, 1971
[73] Assignee Tokyo Denski Kabushiki Kaisha (also known as Tokyo Electric Co., Ltd.)
Tokyo-to, Japan

[54] MEMORY DEVICES FOR USE IN BUSINESS MACHINES
6 Claims, 6 Drawing Figs.

[52] U.S. Cl. .................... 235/60, 235/63
[51] Int. Cl. .................... G06c 23/00
[50] Field of Search .................... 235/60 MT, 63.21, 63.22, 60, 60 M, 6

[56] References Cited
UNITED STATES PATENTS

| | | | |
|---|---|---|---|
| 2,759,667 | 8/1956 | Werner et al. | 235/6 |
| 2,911,141 | 11/1959 | Jackson et al. | 235/6 |
| 3,312,393 | 4/1967 | Gassino et al. | 235/60 |
| 3,329,336 | 7/1967 | Ruys | 235/62 |
| 3,343,788 | 9/1967 | Bennett | 235/60 |

*Primary Examiner*—Stephen J. Tomsky
*Attorneys*—Robert E. Burns and Emmanuel J. Lobato

ABSTRACT: Memory gears are caused to mesh with racks of rack plates by the operator of a readout key and disengaged from the racks by an operating lever driven by a driving mechanism. To read out information stored in the memory gears, a readout key is operated to cause the memory gears to mesh with the racks, and a printing means is operated by the upward movement of the racks. Other racks are provided to limit the upward movement of the rack plates when the summing or memory readout operation is nearly completed.

PATENTED AUG 31 1971 3,602,694

SHEET 3 OF 5

MEMORY DEVICES FOR USE IN BUSINESS MACHINES

BACKGROUND OF THE INVENTION

This invention relates to memory devices for use in business machines and more particularly to a memory device for multiplicands, a readout device to read out memories of information, and means to prevent upward movement of racks utilized in the memory device at the time of readout which are utilized in motor-operated calculating machines, or computers.

In a motor-operated computer, in order to effect multiplications automatically, it is common to store multipliers in a pin carriage and to repeat addition operations the same number of times as the multiplicands. Thus, it is necessary to store the multiplicands in a suitable memory device.

Further, when effecting a subtraction operation by a motor-operated computer, a divisor is repeatedly subtracted from a dividend until a value smaller than the dividend is obtained and the number of subtracting operations is stored in a memory gear as a quotient. As a result it is necessary to read out the stored quotient upon completion of the operation.

Also, in a recording computer, when reading a sum stored in sum gears or memory gears, the sum gears or memory gears are caused to mesh with racks of rack plates to rotate the sum gears or memory gears by an angle corresponding to the quantity or information stored therein concurrent with a corresponding movement of the rack plates whereby to reproduce or print the quantity that has been stored. After printing stored information, the sum gears are disengaged from the racks. With this construction, however, there is a tendency of the rack plates rising beyond a position at which the sum gears or the memory gears disengage therefrom to collide against other component parts, thus producing noise or damaging these component parts. This problem is significant especially when the number stored in the sum gear is small because in this case the stroke of the upward movement is long. While some proposals have been made to limit the upward movement of rack plates they are not satisfactory because of their complicated construction.

SUMMARY OF THE INVENTION

Accordingly, one object of this invention is to provide an improved memory device for use in business machines in which an operating lever does not normally transmit power and hence does not affect other operations, and in which multiplicands and the like can be positively stored in memory gears only when memory buttons are actuated.

Another object of this invention is to provide a novel memory device for use in business machines in which information stored in memory gears is positively read out and then printed by the operation of a readout button, and in which, after printing, the operating lever operates to disengage memory gears from the racks of rack plates.

Still another object of this invention is to provide a novel memory device for use in a business machine which can limit upward movement of rack plates when information stored in sum gears or memory gears are read out.

Briefly stated, in accordance with a preferred embodiment of this invention there is provided a memory device for use in memory machines comprising a main shaft rotatably supported slidable in an axial direction. A pair of spaced-apart supporting arms is secured to the main shaft. A second shaft is supported by the supporting arms and memory gears are mounted on the second shaft. A plurality of rack plates with racks respectively facing the memory gears are provided and a memory button as well as means operated by the memory button to axially move the main shaft. An operating lever is arranged to engage one of the supporting arms when the main shaft is moved axially so as to cause the memory gears to mesh with the racks. To read out information stored in the memory gears, there are provided a readout button, and means operated by the readout button to rotate the supporting arms to mesh the memory gears with the racks printing means operated by the rack plates. A second operating lever cooperating with one of said supporting arms is provided to disengage the memory gears from the racks. The printing means is comprised by gears each associated with a printing drum, a platen roll cooperating with the printing drum, and other racks on rack plates to drive the gears associated with the printing drums. In order to limit upward movement of the rack plates when a summing or memory readout operation is nearly completed, a mechanism is provided including a third set of racks on the rack plates, pawls cooperating with the third set racks and means to cause the pawls to engage said third racks at a point near the end of the upward stroke of the rack plates during a summing or memory readout operation. These pawls and third set of racks are constructed so as not to disturb downward movement of the rack plates. In order to stop the upward movement of the rack plates another mechanism is provided including sum gears adapted to mesh with a fourth set of racks provided for the rack plates and driven thereby when the rack plates are raised and means associated with the sum gears to stop upward movement of the rack plates when the sum gears have been rotated by an angle corresponding to information stored therein.

BRIEF DESCRIPTION OF THE DRAWING

In the accompanying drawing:

FIGS. 2 to 4 are diagrammatic perspective views of a novel device to read out information stored in the memory device, in which FIG. 2 is a perspective view of the essential parts of the readout device, FIG. 3 illustrates the same parts as in FIG. 2 when a memory readout button is operated, and FIG. 4 is a perspective view of the same parts as in FIG. 2 illustrating memory gears separated from rack plates after readout;

FIG. 6 is a side view of the device shown in FIG. 5.

DESCRIPTION OF PREFERRED EMBODIMENT

Figure 1:
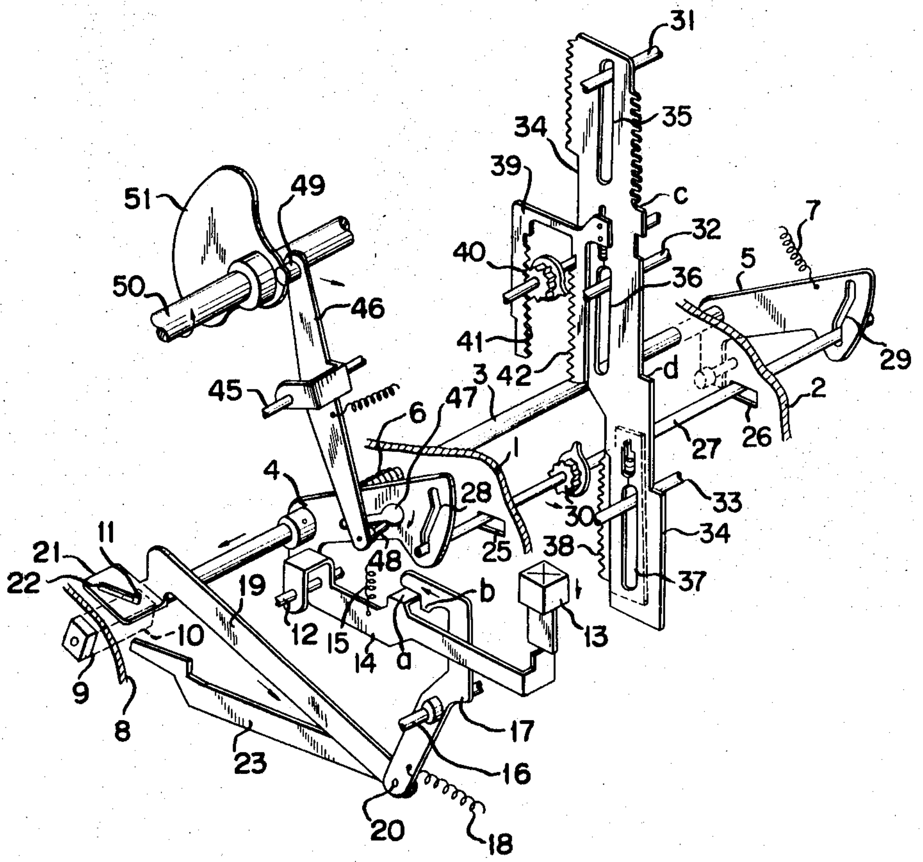
FIG. 1 is a perspective view of one embodiment of a novel memory device for storing multiplicands.

Referring now to FIG. 1, a main shaft 3 is supported by a pair of spaced-apart sideplates 1 and 2 to be rotatable and slidable in the longitudinal or axial direction. Knees of a pair of spaced-apart supporting arms or bellcrank levers 4 and 5 are secured to the shaft 3 and a compression spring 6 surrounding the shaft is interposed between the sideplate 1 and a bellcrank lever 4 to urge the shaft 1 in the direction toward the left indicated by an arrow. On the other hand, the other bellcrank lever 5 is biased to rotate in a counterclockwise direction by means of a spring 7.

A square rod 10 having a pin 11 on its upper surface is connected to one end of main shaft 3 relatively rotatable and for joint axial movement such that main shaft 3 can rotate freely with respect to square rod 10, but the rod can slide together with the main shaft in the longitudinal direction. To this end, the outer end of square rod 10 is received in a square opening in a supporting plate 8 so that it won't rotate but can move axially.

One end of a lever 14 having a memory button 13 at the opposite end is pivotally supported by a shaft 12. The lever 14 is biased upwardly by means of a spring 15. The fore edge of a tab *a* integral with lever 14, is adapted to engage a rear edge of a projection *b* depending from the upper arm of an L-shaped lever 17 which is pivotally supported by a shaft 16 substantially at its center and is biased to rotate in a counterclockwise direction by means of a spring 18 connected to its lower end. One end of a lever 19 is connected to the lower end of the L-shaped lever 17 by means of a pin 20, and a rectangular plate 21 having an inclined slot 22 receiving pin 11 is connected to the other end of the lever 19. One end of a second lever 23 is also connected to the pin 20.

Figure 2:
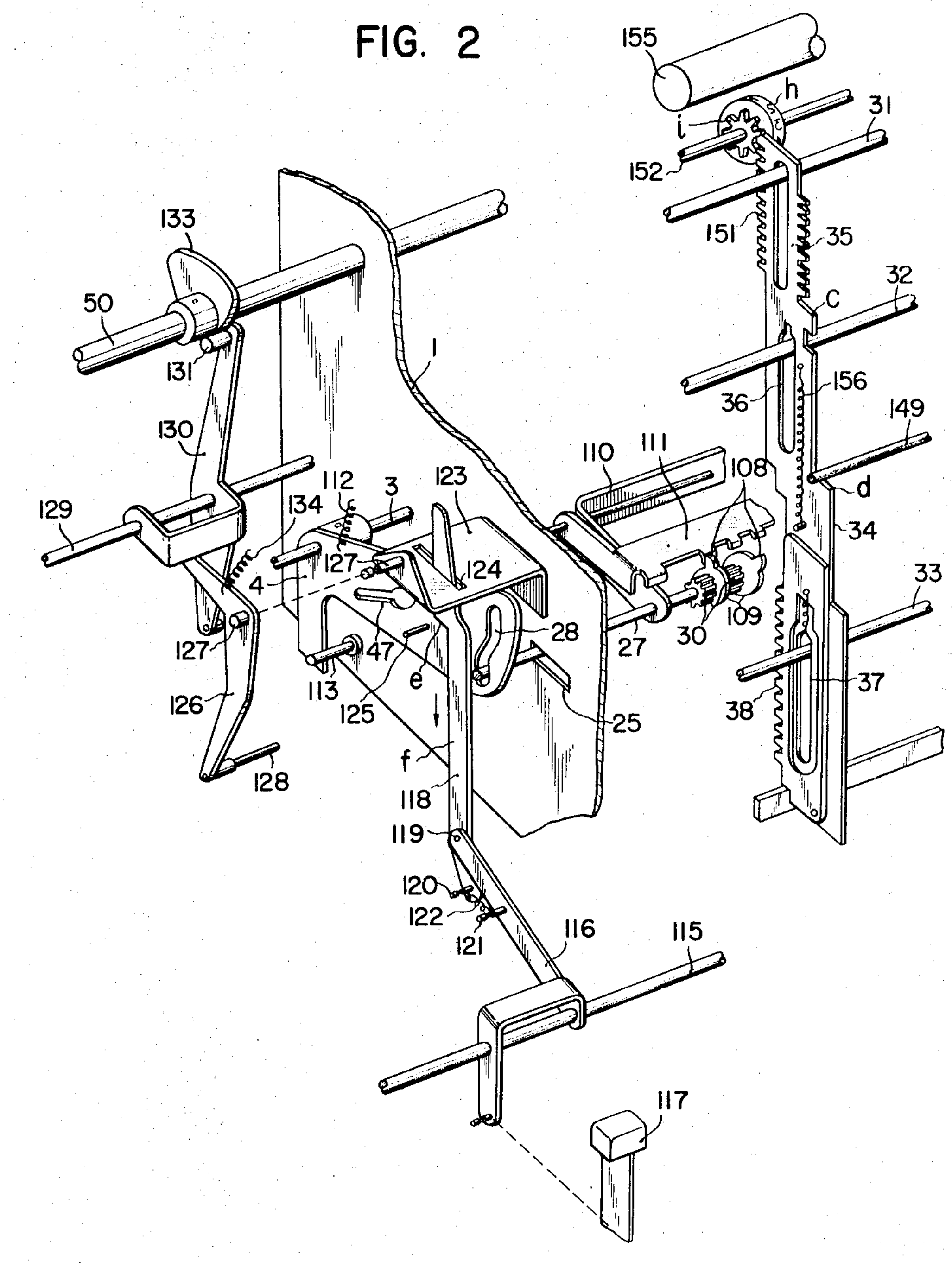

A shaft 27 parallel to the main shaft 3 loosely extends through slots 25 and 26 formed through the sideplates 1 and 2. Opposite ends of the shaft are received in inclined guide slots 28 and 29 near the fore ends of bellcrank levers 4 and 5, respectively. A plurality of memory gears 30 (only two of which are shown in FIG. 2) are mounted on the shaft 27 to rotate independently. A plurality of supporting rods 31, 32 and 33 are received in elongated vertical slots 35, 36 and 37 of each one of a plurality of rack plates 34 (only one of which is shown). A gear rack 38, adapted to engage one of the memory gears 30, is provided on the lower rear edge of each of the rack plates 34. Each rack plate 34 is provided with shoulders or steps *c* and *d* adapted to engage a set pin, not shown, and a clear pin 149 (see FIG. 2) respectively. A second rack plate 39, connected to one side of each rack plate 34, is provided having addition racks 41 and subtraction racks 42 selectively meshing with a sum gear 40.

A central portion of an operating lever 46 is pivotally mounted on a shaft 45, and to the lower end of the operating lever is secured a pin 48 engageable with a keyhole-shaped opening 47 in the adjacent bellcrank lever 4. A cam follower pin 49 is provided on the upper end of operating lever 46 to cooperate with a cam 51 mounted on a shaft 50 of the driving mechanism.

The device shown in FIG. 1 operates as follows. During normal addition operations tab *a* of the lever 14 is disposed engaging projection *b* of the lever 17, and pin 11 is in the fore end of the inclined slot 22 so that the shaft 3 is held in its righthand position wherein pin 48 is disengaged from the opening 47. As a consequence oscillating motion of operating lever 46 caused by rotation of cam 51 is not transmitted to the main shaft 3.

When it is desired to store a multiplicand, the memory button 13 is depressed to rotate the lever 14 in a clockwise direction to disengage tab *a* from the projection *b*. Then, spring 18 operates to rotate the lever 17 in a counterclockwise direction to pull the link 19 and the plate 21 in a forward direction, thus moving pin 11 and the square rod 10 toward the left by the inclined slot 22. Main shaft 3 and the bellcrank levers 4 and 5 are also moved toward the left by the action of the spring 6 to receive pin 48 in the opening 47. Concurrently therewith, rack plate 34 is moved upwardly until its shoulder *d* engages a setpin (not shown) which has been set to the position corresponding to a particular multiplicand to be stored.

Then cam 51 mounted on the camshaft 50 operates to rotate operating lever 46 in a clockwise direction to rotate the main shaft 3 and bellcrank levers 4 and 5 in a clockwise direction, whereby the guide slots 28 and 29 act to push shaft 27 forwardly to mesh gears 30 with racks 38 of the rack plates 34. At this time the clear pin 149 engages a shoulder *c* to lower respective rack plates 34 by a distance equal to their previous upward stroke. As a result, the multiplicands are stored in memory gears 30.

Operating lever 46 is then rotated in a counterclockwise direction to permit the bellcrank levers 4 and 5 to rotate in a counterclockwise direction under the bias of spring 7, thus retracting shaft 27 to disengage memory gears from the racks 38. Thus, gears 30 are maintained in an information-storing condition.

Upon completion of the foregoing operations, the second lever is pulled back by a mechanism not shown to restore levers 17 and 14 to the position shown in FIG. 1.

During the above-described storing operation, sum gears 40 are maintained in a neutral position, not meshing with either addition or subtraction rack 41 or 42.

Figure 3:
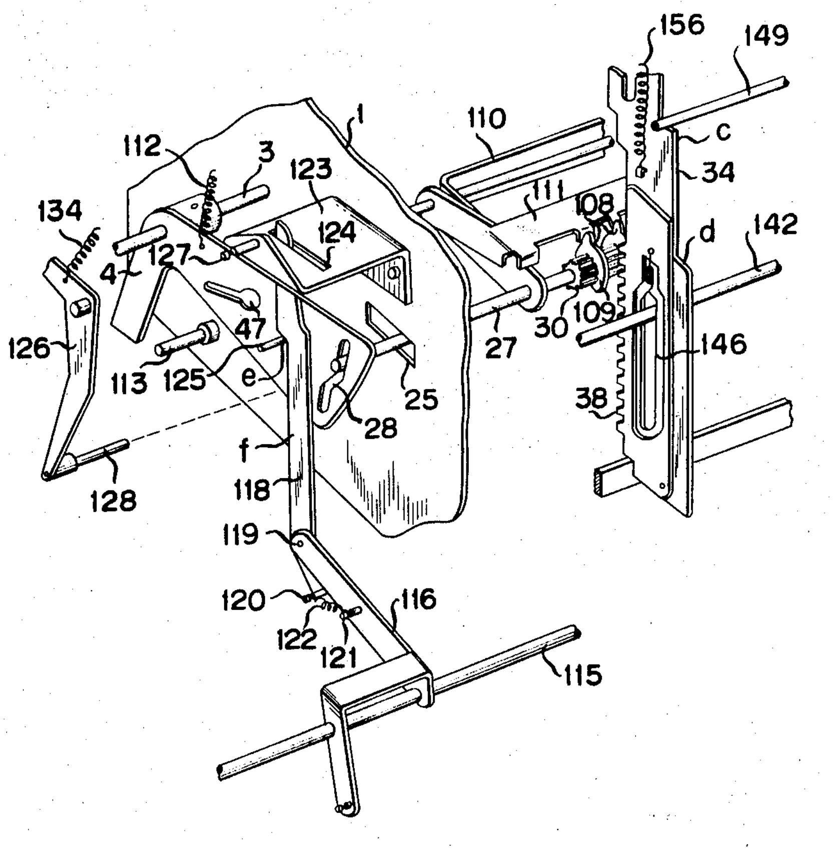
Figures 4, 6:
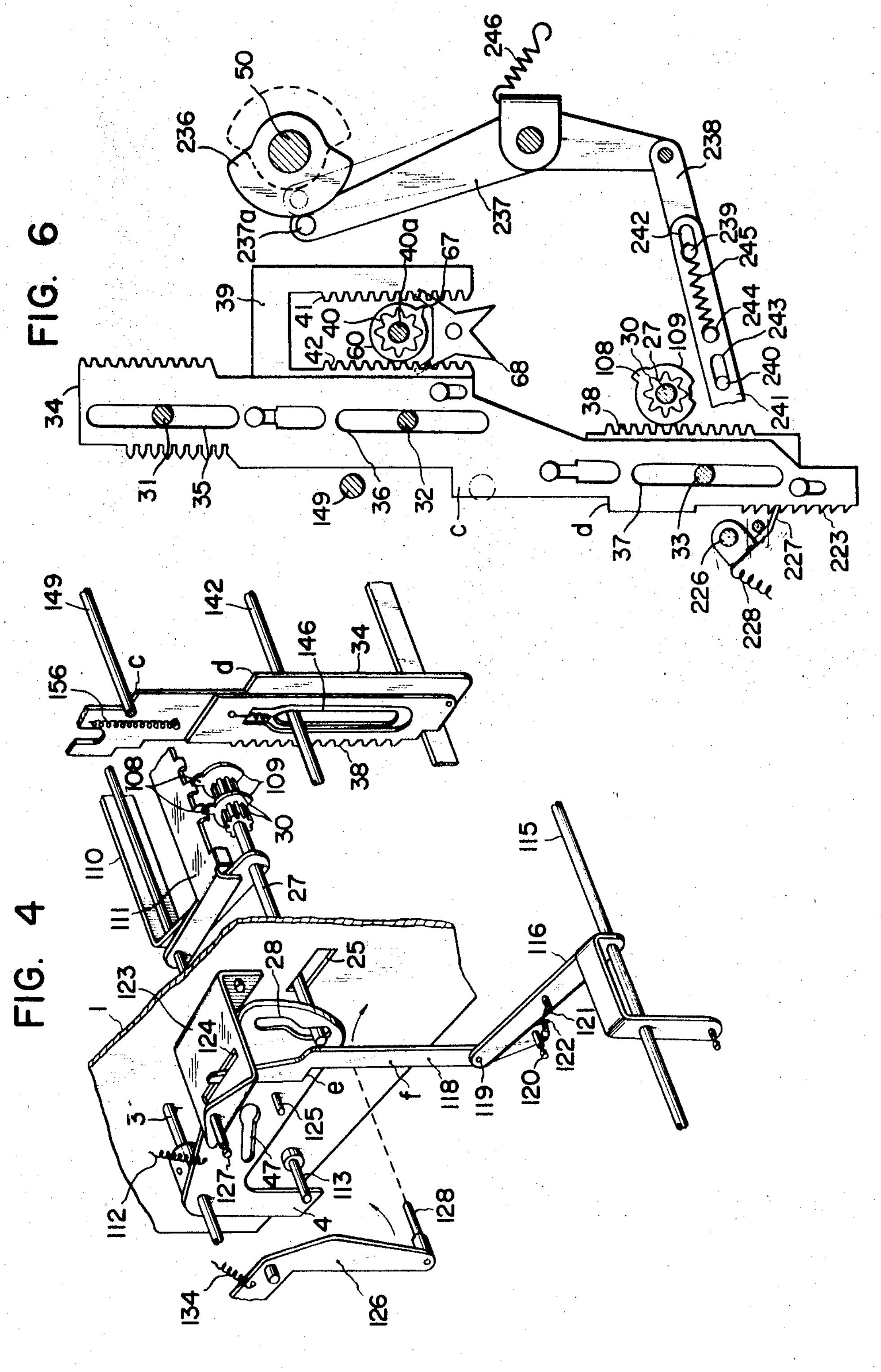

FIGS. 2 to 4 illustrate a novel device for reading out memorized quotients and constructed in accordance with the teaching of this invention.

As shown, a circular disc 109 having a projection 108 is secured to one side of each memory gear 30 and a stop plate 111, having downwardly projecting teeth adapted to engage these projections, is provided for a supporting frame 110 secured to shaft 27. A spring 112 is connected to bellcrank lever 4 to bias it to rotate in a counterclockwise direction, a stop pin 113 is secured on one side of a sideplate 1 to limit the movement of bellcrank lever 4.

A lever member 116 having two arms extending at an angle is pivotally mounted on a shaft 115 provided at the fore end of the machine and the lower arm of lever member 116 is connected to a memory readout button 117 as shown by a dotted line in a manner such that the lower arm is rotated in a counterclockwise direction when the button is depressed. The upper arm of the lever member 116 is connected to a second lever 118 through a pin 119, and a tension spring 122 is provided between a pin 120 secured to the lower end of lever 118 and a pin 121 secured to an intermediate point of the upper arm of lever member 116. The upper end of the second lever 118 is loosely received in a transverse slot 124 of a rectangular plate 123 secured to the sideplate 1. Also a pin 125 is secured to this sideplate to cooperate with a shoulder *e* provided on the lower edge of the upper portion of the second lever. The knee of a bellcrank lever 126 is pivotally mounted on a pin 127 secured to a bent-up edge of a horizontal plate 123, and a projecting pin 128 cooperating with the rear edge *f* of the second lever 118 is secured to the lower end of a bellcrank lever 126. A shaft 129 pivotally supports a lever 130 which is constructed to cooperate with the upper arm of the bellcrank lever 126 having a pin 131 on the upper end thereof arranged to cooperate with a cam 133 secured to the shaft 50 of the driving mechanism. As shown, the bellcrank lever 126 is biased to rotate in a clockwise direction by means of a spring 134.

As described before, each rack plate 34 is provided with a shoulder *d* adapted to cooperate with a setpin (not shown) and a shoulder *c* adapted to cooperate with a clear pin 149. Rack 151 is formed on the upper rear edge of the rack plate to cooperate with one of a plurality of gears *i* (only one of which is shown) mounted on a shaft 152. A printing drum *h* is secured to each gear *i*, and a platen roll 155 is provided on the rear side thereof. Rack plate 34 is biased upwardly by means of a spring 156.

The memory readout device shown in FIGS. 2 to 4 operates as follows. During calculating operations, the memory gears 30 are separated from racks 38 so that quotients are stored in these memory gears 30. To read out these quotients, readout button 117 is depressed to rotate lever means 116 in a counterclockwise direction as viewed in FIG. 2, whereby the shoulder *e* of the second lever 118 depresses the pin 125 to rotate the bellcrank lever 4 and the main shaft 3 in a clockwise direction. The guide slot 28 acts to push the shaft 27 in the forward direction to mesh the memory gears 30 with racks 38 on rack plates 34.

Then clear pin 149 is raised so that each rack plate 34 is raised by a spring 156 until the projection 108 is arrested by the stop plate 111.

Upward movement of the rack plates causes printing drums *h* to rotated through racks 51 and gears *i*, thus bringing the same numerals on the printing drums as those stored in memory gears 30 to a position opposing platen roll 155. Then a printing mechanism (not shown) is operated to print out numerals stored in the memory gears.

Then shaft 50 of the operating mechanism is rotated through a predetermined angle to cause a cam 133 to rotate operating lever 130 in a clockwise direction, thus rotating bellcrank lever 126 in a counterclockwise direction against the bias of the biasing spring 134. Thus, the projecting pin 128 carried by the bellcrank lever engages a rear edge *f* of the second lever 119 to cause it to rotate in a clockwise direction around its pivot pin 119 against the force of the tension spring 122 to disengage shoulder *e* from the pin 125. Consequently, as shown in FIG. 3, the bellcrank lever 4 is rotated in a counterclockwise direction by spring 112 to pull back shaft 27 by its guide slot 28 thus disengaging the memory gears 30 from the racks 38.

Figure 5:
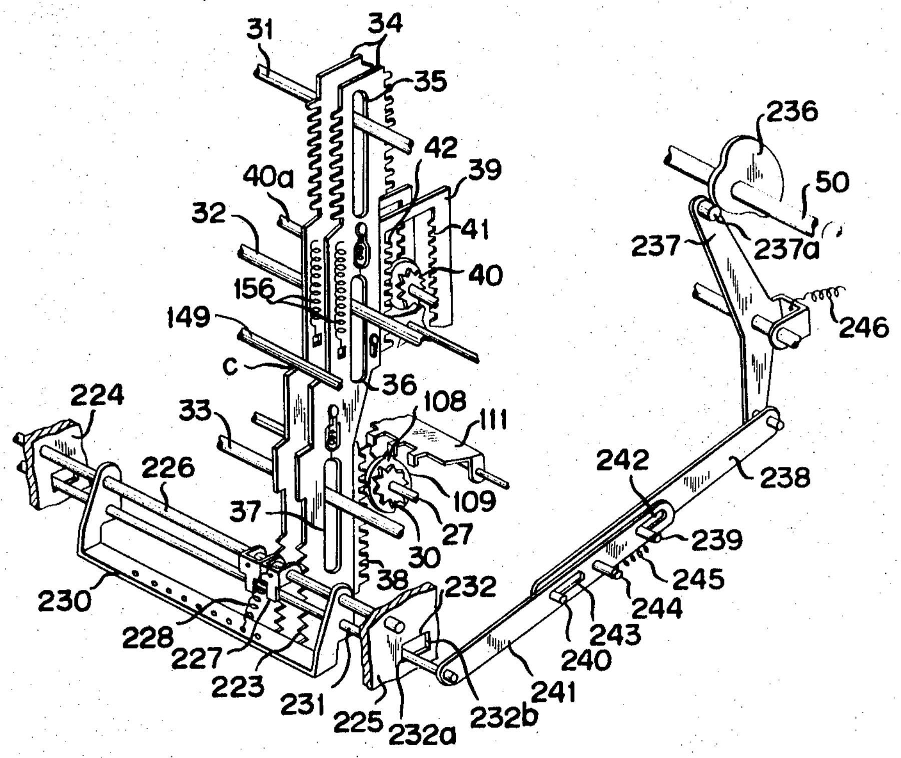
FIG. 5 is a perspective view of a novel device for preventing upward movement of the rack plates at the time of readout.

FIGS. 5 and 6 illustrate a novel device for limiting upward movement of the rack plates when numerals or information stored inthememorygears are read out. On the lower front edge of each rack plate is formed another rack 223 in the form of sawteeth with inclined surfaces facing diagonally downward. Pawls 227 cooperating with these racks are rotatably mounted on a shaft 226 journaled by a pair of spaced-apart sideplates 224 and 225. The pawls are urged in a counterclockwise direction, as viewed in FIG. 6, by means of a spring 228. A U-shaped frame 230 is pivotally mounted on the shaft 226 to support a rod 231 which engages the inner surfaces of the pawls 227. The opposite ends of the rod 231 extend through elongated slots 232 provided in the sideplates 224 and 225.

A cam 236 is mounted on the shaft 50 of the driving mechanism to operate a cam follower pin 237*a* on the upper end of a lever 237 which is pivotally supported at its center and connected to one end of a link 238 at its lower end. Pins 239 and 240 secured to one side of the link 238 are received in elongated slots 242 and 243, respectively, of another link 241, and the fore end of the other link 241 is connected to the projected end of the rod 231 as shown in FIG. 5. A pin 239 is connected to a pin 244 secured to one side of the link 241 by means of a spring 245. Lever 237 is biased in a clockwise direction, as viewed in FIG. 6, by means of a spring 246.

The operation of the device illustrated in FIGS. 5 and 6 is as follows. First, it is assumed that the clear pin 149 is held at its lower position to maintain rack plates 34 in their lowermost position. During summing operations or during readout operation of numerals stored on the sum gears 40, a shaft 40*a* supporting the sum gears 40 is moved toward the left as viewed in FIG. 6 to cause these sum gears to mesh with a subtraction rack 42. When the clear pin 149 is raised the rack plates 34 are moved upwardly by springs 156 to rotate the sum gears 40. When the sum gears 40 are rotated by angles corresponding to the numerals recorded thereon, projections 67 of the discs 60 associated with respective gears 40 are arrested by pawls 68, thus stopping upward movement of the rack plates 34. Upward movement of the rack plates set printing boards (not shown) to numerals respectively stored in the sum gears 40, and then these printing boards are operated by a suitable device, not shown, to print readout numerals on a recording medium. Near the end of the summing or readout operation, that is at a point slightly above a position at which the rack plates 34 can rise to indicate a numeral 9, shaft 50 has rotated its cam 236 in a counterclockwise direction from a position indicated by dotted line to a position indicated by a solid line to retract links 238 and 241, thus moving a rod 231 from a front edge 232*a* to a rear edge 232*b* of a slot 232. Thus, the pawls 227 are permitted to rotate in a counterclockwise direction as viewed in FIG. 5 under the bias of the spring 228 to engage the racks 223, whereby upward movement of the rack plate 34 can be prevented. This prevents upward movement of the racks plate 34 even when the rack 41 or 42 may happen to disengage from the sum gears 40.

As described before, racks 223 are in the form of sawteeth having flat upper surfaces and inclined surfaces facing downwards, so that when clear pin 149 is lowered to engage shoulders *c*, the racks 223 can descend freely without being arrested by the pawls 227. When the pin 149 is lowered sufficiently to lower respective rack plates 34 to their 0 position, the cam 236 assumes the position shown in FIG. 5 to operate the lever 237 and the links 238 and 441 in the opposite direction until the rod 231 engages fore edge 232*a* of the slot 232. Thus, pawls 227 are rotated in a clockwise direction to disengage from the racks.

We claim:

1. A memory device for use in business machines comprising a main shaft rotatably supported and slidable in an axial direction, a pair of spaced-apart supporting arms secured to said main shaft, a second shaft supported by said supporting arms, memory gears mounted on said second shaft, said supporting arms having slots to slidably receive said second shaft so that said main shaft can slide in the axial direction independently of said second shaft, a plurality of movable rack plates comprising racks respectively facing said memory gears, a memory key, means operated by said memory key to move axially said main shaft, and an operating lever arranged to engage at least one of said supporting arms when said main shaft is moved axially to cause said memory gears to mesh with said racks.

2. The memory device according to claim 1, including a clear pin and a setpin, and wherein each one of said rack plates is provided with a plurality of shoulders to engage said clear pin and said setpin, respectively, means to position the setpin in positions corresponding to individual multiplicands, and means to raise said rack plate until one of its shoulders engages said setpin which is set to a position corresponding to a multiplicand to be stored, and means lowering the rack plate with said clear pin, whereby a multiplicand is stored in one of said memory gears.

3. The memory device according to claim 1 wherein said memory device further comprises a readout key, means responsive to the operation of said readout key to rotate said supporting arms to cause said memory gears to mesh with said racks, printing means operated by said rack plates, a second operating lever cooperating with one of said supporting arms to disengage said memory gears from said racks.

4. The memory device according to claim 3 wherein said printing means comprises a plurality of printers gears, a plurality of printing drums each associated with one of said gears, a platen roll cooperating with said printing drums, and other racks on said rack plates to drive said printer gears.

5. The memory device according to claim 1 wherein said memory device further comprises, other racks formed on the back of said rack plates, pawls cooperating with said other racks, and means to cause said pawls to engage said other racks at a point near the end of the stroke of said rack plates in one direction during summing or memory readout operation, said pawls and said other racks including teeth on said other racks being constructed so as not to disturb downward movement in an opposite direction of said rack plates.

6. The memory device according to claim 1 wherein said memory device comprises racks for meshing with sum gears, sum gears to mesh with the last-mentioned racks on said rack plates to be driven thereby when said rack plates are moved in said one direction, and means associated with said sum gears to stop the movement of said rack plates in said one direction when said sum gears have been rotated by an angle corresponding to information stored therein.